United States Patent [19]

Morimoto et al.

[11] Patent Number: 4,482,981

[45] Date of Patent: Nov. 13, 1984

[54] INPUT DEVICE FOR POCKET ELECTRONIC TRANSLATOR

[75] Inventors: Masafumi Morimoto, Yamatokoriyama; Shigenobu Yanagiuchi, Tenri; Noboru Akizuki, Yamatokoriyama, all of Japan

[73] Assignee: Sharp Kabushiki Kaisha, Osaka, Japan

[21] Appl. No.: 445,512

[22] Filed: Nov. 30, 1982

[30] Foreign Application Priority Data

Dec. 2, 1981 [JP] Japan ............... 56-194788

[51] Int. Cl.³ ............................. G06F 15/38
[52] U.S. Cl. .................................... 364/900
[58] Field of Search ... 364/200 MS File, 900 MS File

[56] References Cited

U.S. PATENT DOCUMENTS 4,328,562 5/1982 Hashimoto ............ 364/900
4,339,806 7/1982 Yoshida ................. 364/900
4,381,551 4/1983 Kanou et al. ........... 364/900

Primary Examiner—Raulfe B. Zache
Attorney, Agent, or Firm—Birch, Stewart, Kolasch & Birch

[57] ABSTRACT

An input device for inputting a first word represented in a first language, the input device being adapted for an electronic translator for obtaining a second word represented in a second language, equivalent to the first word, in response to the input of the first word, comprises a first specifying key for specifying one of alphabets to define a first alphabet, a second specifying key for specifying one of the alphabets to define a second alphabet, an input device for controlling the first and the second specifying keys to input said first and second alphabets into the electronic translator, a memory for memorizing a plurality of full words, an access circuit provided for addressing the memory words starting with the first and second alphabets, and a display responsive to the access circuit for displaying the words.

9 Claims, 39 Drawing Figures

FIG. 8

| | KEY | DISPLAY |
|---|---|---|
| (1) | ■□ | ア (A) |
| | | イ (I) |
| | | ⋮ |
| (2) | ■□ | キ (KI) |
| (3) | □■ | キア (KI-A) |
| | | キイ (KI-I) |
| | | ⋮ |
| (4) | □■ | キツ (KI-TSU) |
| (5) | ▶ | キツイ (KI-TSU-I) |
| | | キッテ (KI-TTE) |
| | | キツネ (KI-TSU-NE) |
| (6) | ▶ | キップ (KI-PPU) |
| (7) | TR = | ticket |

FIG. 9

| | KEY | DISPLAY |
|---|---|---|
| (1) | ■□ | ア (A) |
| | | イ (I) |
| | | ウ (U) |
| | | ⋮ |
| (2) | ■□ | シ (SHI) |
| (3) | □■ | シア (SHI-A) |
| | | シイ (SHI-I) |
| | | ⋮ |
| (4) | | シン (SHI-N) |
| (5) | ■□ | シ゛ (JI) |
| (6) | ▶ | シ゛ (JI) ⟨ッ゛コク(JI-KO-KU)⟩ |
| | | シ゛ェットキ (JYE-TTO-KI) |
| | | シ゛カン (JI-KA-N) |
| | | ⋮ |
| (7) | ▶ | シ゛テンシャ (JI-TE-N-SHA) |
| (8) | TR = | bycycle |

FIG.10

|     | KEY | DISPLAY | |
|-----|-----|---------|---|
| (1) |  | d o g | E→J |
| (2) | MARK R·CM | d o g | |
| (3) |  | ネコ (NE-KO) | J→E |
| (4) | MARK R·CM | ネコ (NE-KO) | |
| (5) | C·CE | — | E→J |
| (6) | MARK R·CM | c a t | |
| (7) | TR = | ネコ (NE-KO) | |
| (8) | MARK R·CM | d o g | |

FIG. 12

| | |
|---|---|
| EA { | "a" START ADDRESS (S.A.) |
| | "b" S.A. |
| | ⋮ |
| | "z" S.A. |
| JA { | 「ア(A)」S.A. |
| | 「イ(I)」S.A. |
| | ⋮ |
| | 「キ(KI)」S.A. |
| | ⋮ |
| | 「シ(SHI)」S.A. |
| | ⋮ |
| | 「ワ(WA)」S.A. |
| WA { | アイ (A-I) / love |
| | ⋮ |
| | イヌ (I-NU) / dog |
| | ⋮ |
| | キ (KI) / tree |
| | ⋮ |
| | キチョウナ (KI-CHO-NA) / precious |
| | キツイ (KI-TSU-I) / tight |
| | キッテ (KI-TTE) / stamp |
| | キツネ (KI-TSU-NE) / fox |
| | キップ (KI-PPU) / ticket |
| | ⋮ |
| | シ (SHI) / four |

↓ TO THE RIGHT ROM FORMAT

| | |
|---|---|
| | シアイ (SHI-A-I) / match |
| | ⋮ |
| | シンブン (SHI-N-BU-N) / newspaper |
| | ジ(JI)〈ジコク(JI-KO-KU)〉 / time |
| | ジェットキ (JYE-TTO-KI) / jet plane |
| | ジカン (JI-KA-N) / time |
| | ⋮ |
| | ジテンシャ (JI-TE-N-SHA) / bycycle |
| WA ⟩ | |
| | ⋮ |
| | チチ (CHI-CHI) / dad |
| | ⋮ |
| | ドック (DO-KKU) / dock |
| | ⋮ |
| | ネコ (NE-KO) / cat |
| | ⋮ |
| | ワンパクナ (WA-N-PA-KU-NA) / naughty |
| | END CODE |
| SA ⟩ | "a" ADDRESS |
| | "abandon" ADDRESS |
| | ⋮ |
| | "dad" ADDRESS |
| | ⋮ |
| | "zoo" ADDRESS |
| | END CODE |

FIG. 13 (4)
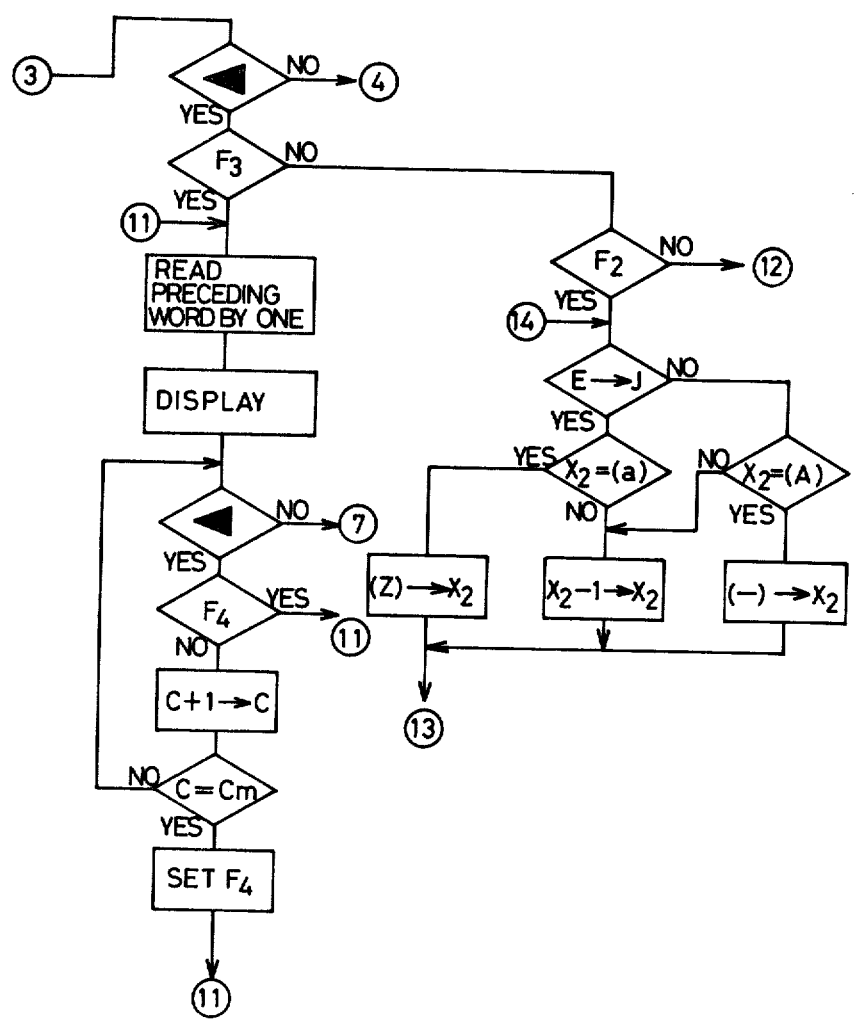

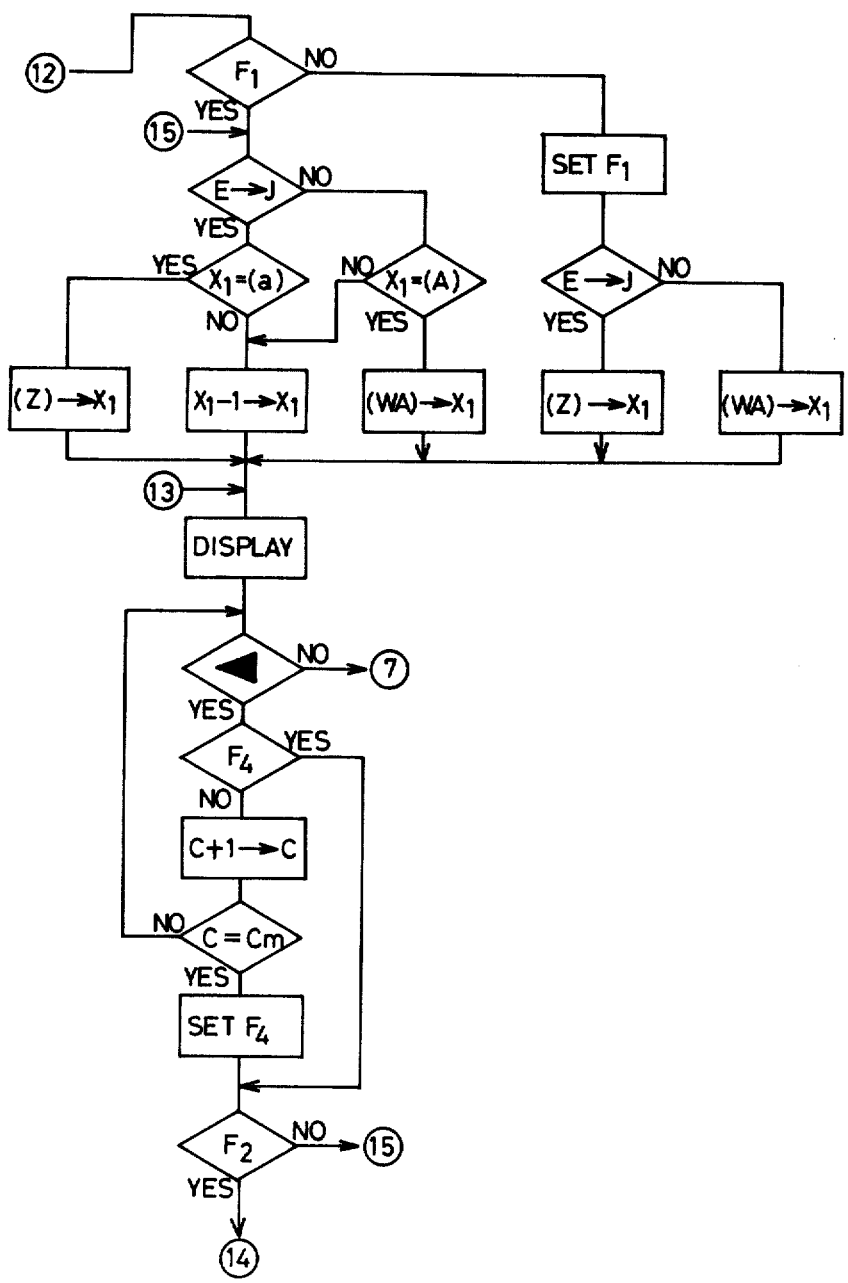
FIG. 13 (5)

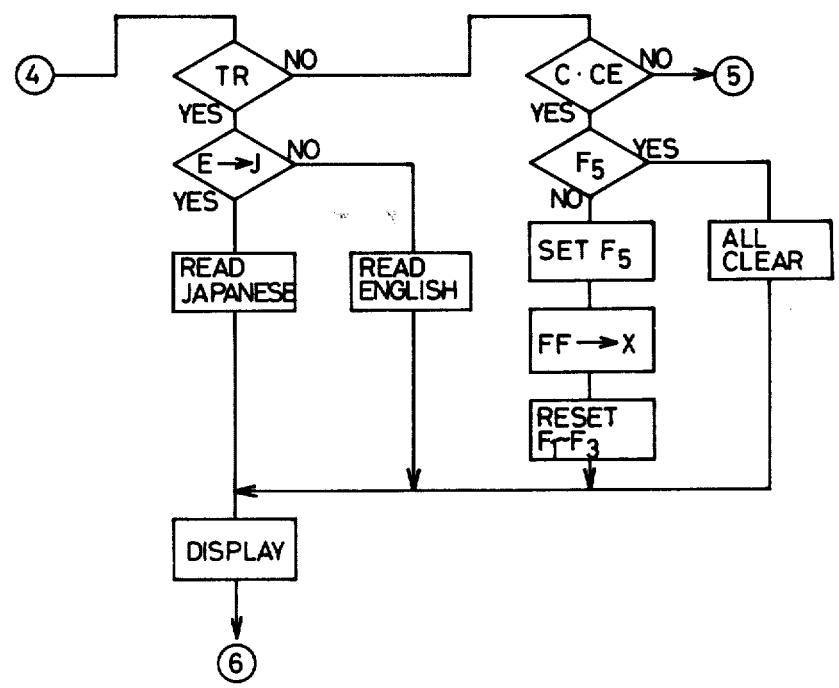
FIG. 13 (6)

FIG.14(1)

| ALPHABET & SIGN | CODE |
|---|---|
| a | 0 0 0 0 0 0 0 0 |
| b | 0 0 0 0 0 0 0 1 |
| ⋮ | ⋮ |
| j | 0 0 0 0 1 0 0 1 |
| k | 0 0 0 0 1 0 1 0 |
| ⋮ | ⋮ |
| p | 0 0 0 0 1 1 1 1 |
| q | 0 0 0 1 0 0 0 0 |
| ⋮ | ⋮ |
| z | 0 0 0 1 1 0 0 1 |
| ア (A) | 0 0 0 1 1 0 1 0 |
| イ (I) | 0 0 0 1 1 0 1 1 |
| ⋮ | ⋮ |
| カ (KA) | 0 0 0 1 1 1 1 1 |
| キ (KI) | 0 0 1 0 0 0 0 0 |
| ⋮ | ⋮ |
| タ (TA) | 0 0 1 0 1 0 0 1 |
| チ (CHI) | 0 0 1 0 1 0 1 0 |
| ⋮ | ⋮ |
| ニ (NI) | 0 0 1 0 1 1 1 1 |
| ヌ (NU) | 0 0 1 1 0 0 0 0 |
| ネ (NE) | 0 0 1 1 0 0 0 1 |

FIG.14(2)

| ALPHABET & SIGN | CODE |
|---|---|
| ノ (NO) | 0 0 1 1 0 0 1 0 |
| ⋮ | ⋮ |
| ミ (MI) | 0 0 1 1 1 0 0 1 |
| ム (MU) | 0 0 1 1 1 0 1 0 |
| ⋮ | ⋮ |
| ヤ (YA) | 0 0 1 1 1 1 0 1 |
| ユ (YU) | 0 0 1 1 1 1 1 0 |
| ヨ (YO) | 0 0 1 1 1 1 1 1 |
| ラ (RA) | 0 1 0 0 0 0 0 0 |
| ⋮ | ⋮ |
| ワ (WA) | 0 1 0 0 0 1 0 1 |
| ヲ (WO) | 0 1 0 0 0 1 1 0 |
| ン (N) | 0 1 0 0 0 1 1 1 |
| ゛ | 0 1 0 0 1 0 0 0 |
| ゜ | 0 1 0 0 1 0 0 1 |
| ー | 0 1 0 0 1 0 1 0 |
| ァ (A) | 0 1 0 0 1 0 1 1 |
| ィ (I) | 0 1 0 0 1 1 0 0 |
| ゥ (U) | 0 1 0 0 1 1 0 1 |
| ェ (E) | 0 1 0 0 1 1 1 0 |
| ォ (O) | 0 1 0 0 1 1 1 1 |
| ッ (TSU) | 0 1 0 1 0 0 0 0 |
| ャ (YA) | 0 1 0 1 0 0 0 1 |
| ュ (YU) | 0 1 0 1 0 0 1 0 |
| ョ (YO) | 0 1 0 1 0 0 1 1 |

INPUT DEVICE FOR POCKET ELECTRONIC TRANSLATOR

BACKGROUND OF THE INVENTION

The present invention relates to an information retrieval system and, more particularly, to a word information retrieval system adapted to output words (translated words) by specifying entry words in an electronic apparatus such as a translator.

Recently, electronic devices called electronic translators have become available on the market. The electronic translators require efficient and rapid retrieval of word imformation stored in a memory.

Conventionally, to specify the entry words, it is required to actuate a plurality of key switches. Therefore, it is expected to reduce the number of the key switches to be actuated in specifying the entry words.

SUMMARY OF THE INVENTION

Accordingly, it is an object of the present invention to provide an improved electronic translator for enabling rapid input of word information into the translator.

It is another object of the present invention to provide an improved electronic translator for inputting word information to be retrieved from a memory with few operations of input key means.

It is a further object of the present invention to provide an improved electronic translator for retrieving word information from a memory with first and second search key to input the word information into the translator. It is a still further object of the present invention to provide an improved electronic translator for providing an analog display to show a present letter serach operation.

Briefly described, in accordance with the present invention, an input device for inputting a first word represented in a first language, the input device being adapted for an electronic translator for obtaining a second word represented in a second language, equivalent to the first word, in response to the input of the first word, comprises first specifying means for specifying one of alphabets to define a firs alphabet, second specifying means for specifying one of the alphabets to define a second alphabet, input means for controlling the specifying means to input said first and second alphabets into the electronic translator, memory means for memorizing a plurality of full words, access means provided for addressing the memory means to retrieve words starting with the first and second alphabets, and display means responsive to the access means for displaying the words.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIGS. 5 to 10 shows search examples related between key switches operated and display examples;

FIG. 12 shows the contents of a word memory (ROM) connected in the circuit of FIG. 11;

FIGS. 14(1) and 14(2) show tables representing the relations between alphabets or signs and codes;

DESCRIPTION OF THE INVENTION

First of all, any kind of languages can be applied to an electronic translator of the present invention. Input words are spelled in a specific language to obtain equivalent words, or translated words spelled in a different language corresponding thereto. The kind of the languages can be freely selected. According to an example of the present invention, it is assumed that the input language is English and the translated language is Japanese. The electronic translator can operate as a conventional electronic calculator.

Figure 1:
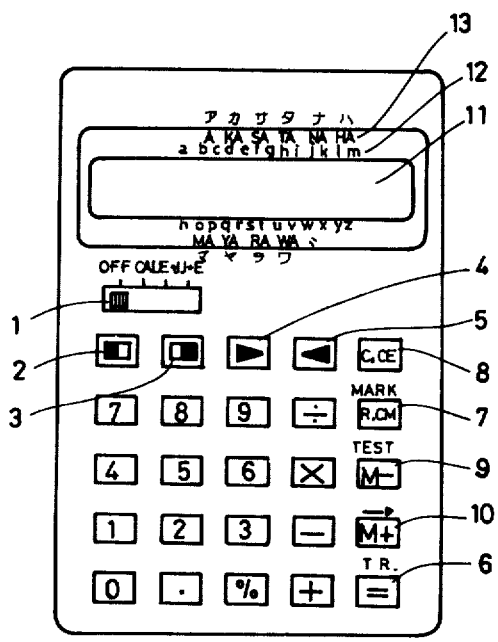
FIG. 1 shows a plan view of a pocket electronic translator according to the present invention.
Figure 2:
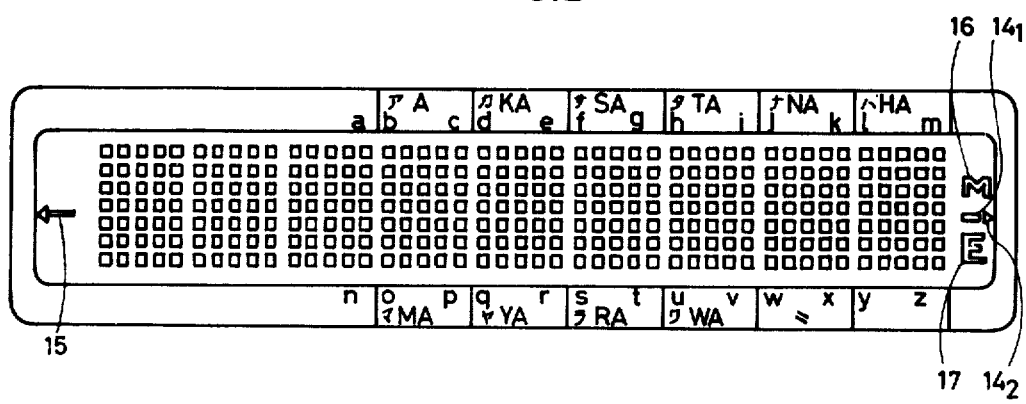
FIG. 2 shows a display implemented within the translator of FIG. 1, the display comprising a great number of display patterns.

FIG. 1 shows the electronic translator according to the present invention. The translator comprises a mode selector 1, a first-letter forward search key 2, a second-letter forward search key 3, an alphabet input and entry word forward search key 4, a backward search key 5, a translation key 6, a mark key 7, a clear/clear entry (C.CE) key 8, a test key 9, a display switch key 10, a display 11, a-z indexes 12 and Japanese syllabary indexes 13. FIG. 2 shows the detailed construction of the display 11 comprising a plurality of display patterns $14_1$, $14_2$, 15 16 and 17.

The mode selector 1 is slided to select one of a power off mode, a calculator mode, an English to Japanese translation mode and a Japanese to English translation mode. The position of selecting the English to Japanese translation mode is denoted as "E→J" in FIG. 1. The position of selecting the Japanese to English translation mode is denoted as "J→E" in FIG. 1.

In the English to Japanese translation mode, the first-letter forward search key 2 continues to be operated or is repeatedly operated to subsequently display the English alphabets in the top digit of the display 11 in the English alphabetical order. In the Japanese to English translation mode, the first-letter forward search key 2 continues to be operated or is repeatedly operated to subsequently display the Japanese alphabets ("Katakana"s) in the top digit of the display 11 in the Japanese alphabetical order.

In the English to Japanese translation mode, the second-letter forward search key 3 continues to be operated or is repeatedly operated to subsequently display the English alphabets in the second digit from the top of the display 11 in the English alphabetical order. In the Japanese to English translation mode, the second-letter forward search key 3 continues to be operated or is repeatedly operated to subsequently display the Japanese alphabets ("Katakana"s) in the second digit from the top of the display 11 in the Japanese alphabetical order. Signs for a voiced sound, a semi-voiced sound, and a long vowel follows the Japanese alphabets when the second-letter forward search key 3 continues to be operated or is repeatedly operated.

In the English to Japanese translation mode or the Japanese to English translation mode, the first-letter forward search key 2, the second-letter forward search key 3, and the backward search key 5 are selected to select a specific alphabet or alphabets. The alphabet input and entry word forward search key 4 is operated to input the selected alphabet or alphabets into the translator.

Responsive to the operation of this key 4, an English word (in the English to Japanese translation mode) or a Japanese word (in the Japanese to English translation mode) is retrieved which leads a group of words starting with the selected alphabet or alphabets in the English alphabetical order (in the English to Japanese translation mode) or the Japanese alphabetical order (in the Japanese to English translation mode). The English word or the Japanese word is displayed in the display 11.

When the key 4 continues to be operated or is repeatedly operated, some English words (in the English to Japanese translation mode) or some Japanese words (in the Japanese to English translation mode) are developed from a memory and displayed in the display 11 in the English alphabetical order or the Japanese alphabetical order.

While the first-letter and the second-letter forward search keys 3 and 4, and any other keys are not operated to select a specific alphabet or alphabets, the key 4 is operated to subsequently retrieve and display the English words (in the English to Japanese translation mode) and the Japanese words (in the Japanese to English translation mode) in the English alphabetical order or the Japanese alphabetical order from the first word to a subsequent one.

Before the second-letter forward search key 3 is operated, the backward search key 5 is operated to search the first letters in a direction reverse to the alphabetical order. After the second-letter forward search key 3 is operated and before the alphabet input and entry word forward search key 4 is operated, the backward search ket 5 is operated to search the second letters in the reverse direction. After the alphabet input and entry word forward search key 4 is operated, the backward search key 5 is operated to search entry words in the reverse direction.

The translation key 6 is operated to translate the selected words in the two translation modes. In the calculator mode, this key 6 is operated as an equal key. After the key 4 or 5 is operated to select any English or Japanese word, the translation key 6 is operated to translate the word and display the translated word in the display 11.

The mark key 7 is operated to mark selected words and retrieve the marked words in the translation modes. In the calculator mode, this key 7 is operated as a memory recall/memory clear (R/CM) key.

The clear/clear entry (C.CE) key 8 is operated to cancel inputted word information in the translation modes and inputted digit information in the calculator mode, totally or partially. The test key 9 is operated to at random retrieve and display stored English words in the English to Japanese translation mode and stored Japanese words in the Japanese to English translation mode. In the calculator mode, the test key 9 is operated to memorize inputted digit information as a negative number.

In the two translation modes, the display switch key 10 is operated to switch the contents of a display. When the number of the alphabets of one or more words to be displayed in the display 11 exceeds the number of the display digits in the display 11, a starting part of the one or more words is firstly displayed in the display 11 together with a continuation symbol "→" to indicate that the other part of the one or more words remains. To illuminate the continuation symbol, the two display patterns 14₁ and 14₂ of FIG. 2 are selected. Under the circumstances, the display switch key 10 is operated to display the remaining part. At the same time, a following symbol "←" is illuminated by selecting the display pattern 15 of FIG. 2.

When the display switch key 10 is further operated, the starting part of the one or more words is re-displayed. Thereafter, each time this key 10 is operated, the same operations are repeated.

In the calculator mode, the display switch key 10 is operated to memorize inputted digit information as a positive number.

In the calculator mode, the display pattern 14₁ is illuminated to indicate that a displayed figure is negative. The display pattern 16 is illuminated to show a memory symbol "M" while a memory register is operated. The display pattern 17 is illuminated to show an error symbol "E" while an error is happened.

The remaining key switches except for those as described above are operated only in the calculator mode.

The a-z indexes 12 and the Japanese syllabary indexes 13 are used to provide an analog display in selecting one or more alphabets to be inputted.

Figure 3:
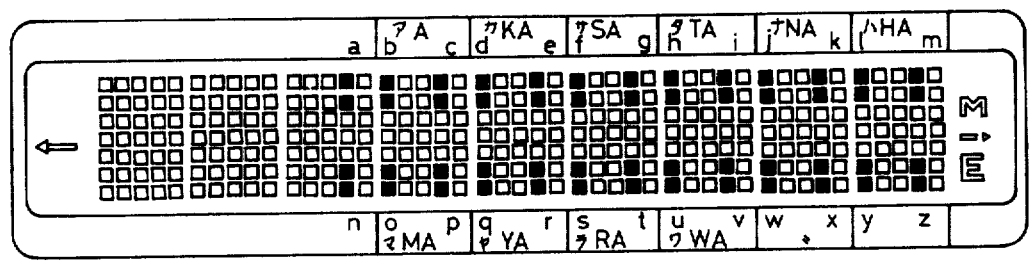
FIGS. 3(1) to 3(6) and 4(1) to 4(9) show display examples enabled in a letter search operation.
Figure 3:
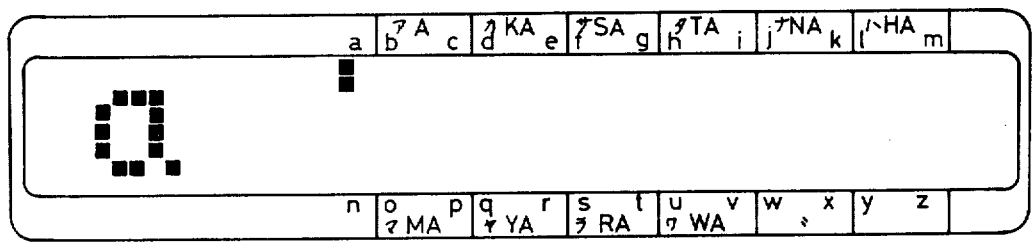
Figure 3:
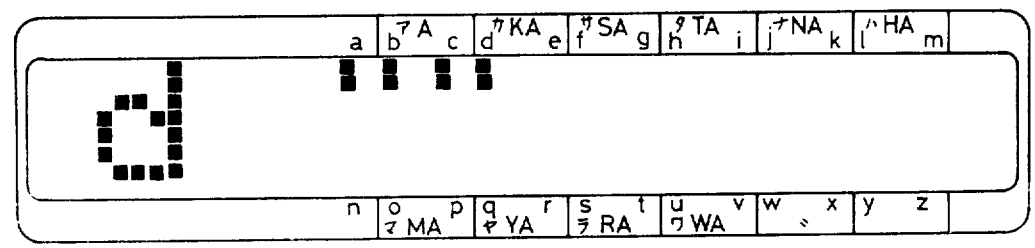
Figure 3:
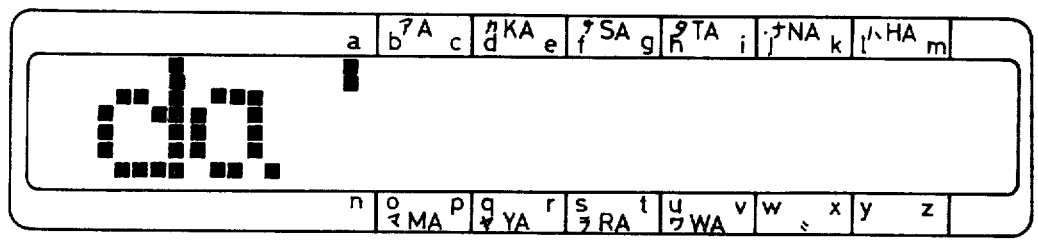
Figure 3:
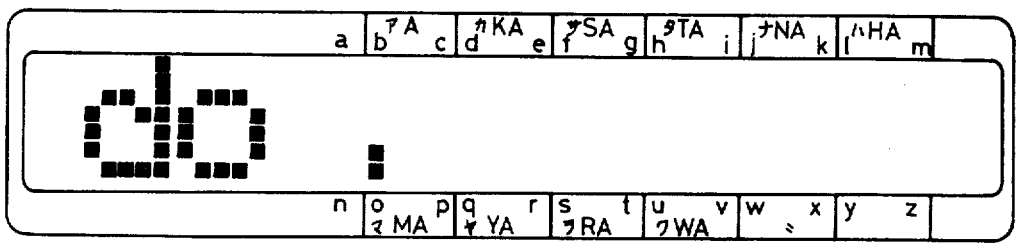
Figure 3:
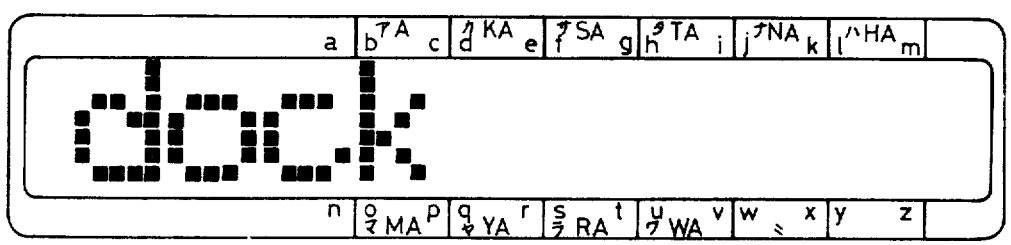

FIGS. 3(1) to 3(6) and 4(1) to 4(9) show display examples enabled in a letter search operation. The a-z indexes 12 and the Japanese syllabary indexes 13 are used.

FIGS. 3(1) shows a plurality of display dots used in searching one or more alphabets to be inputted in the English to Japanese translation mode. Among the display dots alloted in seven lower digits, the first and the second dots from the top, and the first and the second dots from the bottom are used in searching one or two alphabets to be inputted. These dots to be used are shown to be black.

FIGS. 3(2) and 3(3) show examples in searching the first English alphabets. FIGS. 3(a) shows a case of selecting a first alphabet "a". FIG. 3(3) shows a case of selecting a first alphabet "d". The selected first alphabets are displayed in the top degit of the display 11. As FIGS. 3(3) and 3(4) show, some display dots from the dots related to "a" in the a-3 indexes 12 to the dots related to "d" in the indexes 12 ["d" is a selected alphabet in FIG. 3(3)] are all illuminated to provide an analog display in selecting an alphabet.

FIGS. 3(4) and 3(5) show examples in searching the second English alphabets. FIG. 3(4) shows a case of selecting a second alphabet "a". FIG. 3(5) shows a case of selecting a second alphabet "o". The selected second alphabets are displayed in the second digit of the display 11. As FIGS. 3(4) and 3(5) show, only the two dots related to "a" in the a-z indexes 12 (FIG. 3(4)) and "o" in the indexes 12 (FIG. 3(5)) are illuminated to provide an analog display.

FIG. 3(6) shows an example where an English word "dock" is displayed in the display 11, "dock" being a word leading the words starting with "do".

Figure 4:
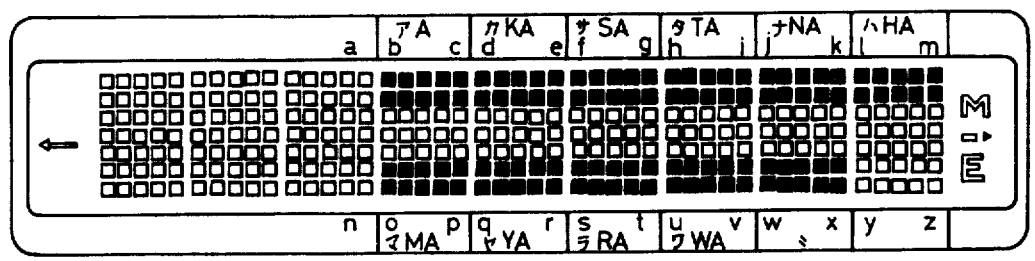
Figure 4:
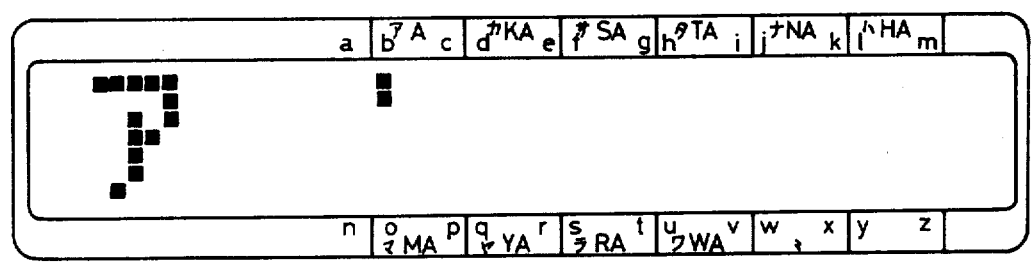
Figure 4:
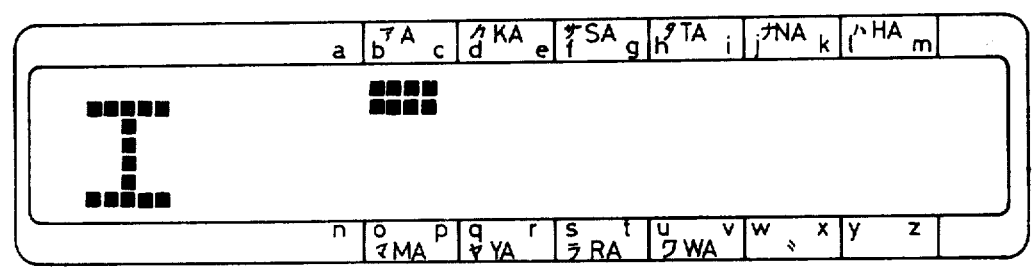
Figure 4:
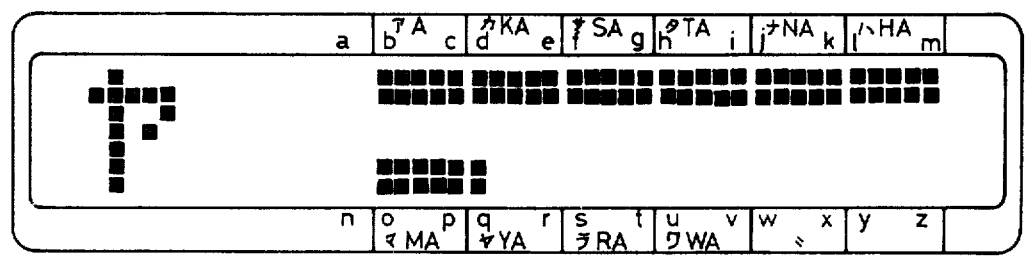
Figure 4:
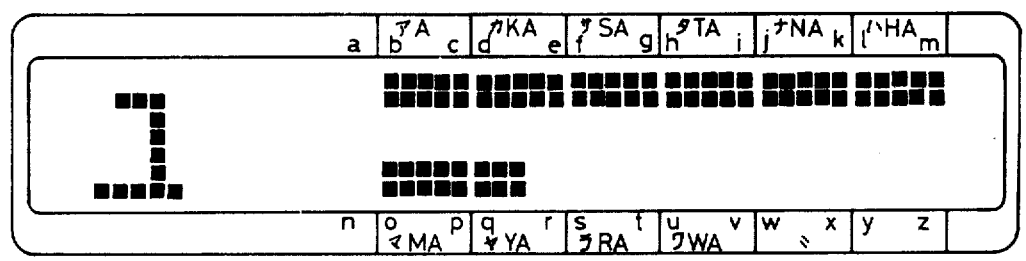
Figure 4:
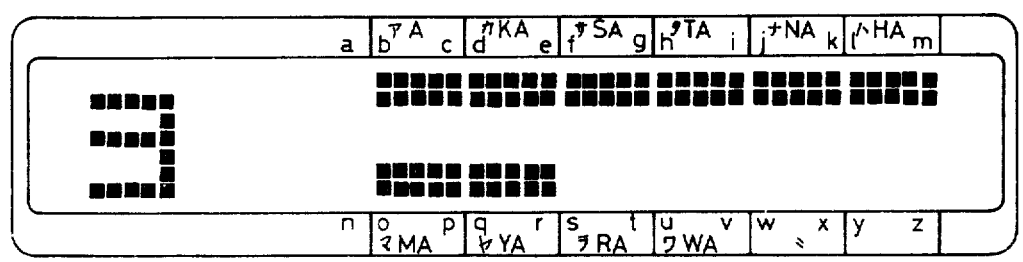
Figure 4:
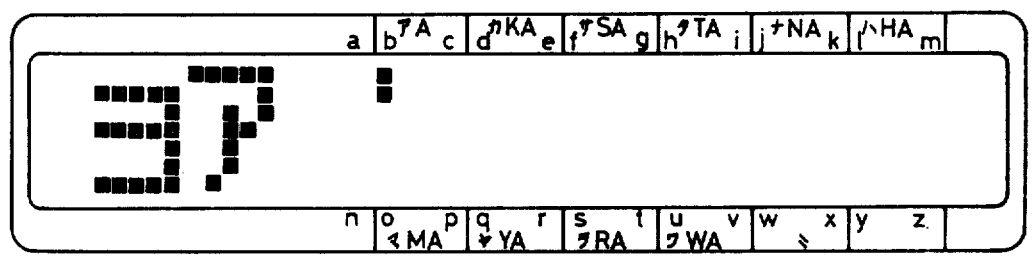
Figure 4:
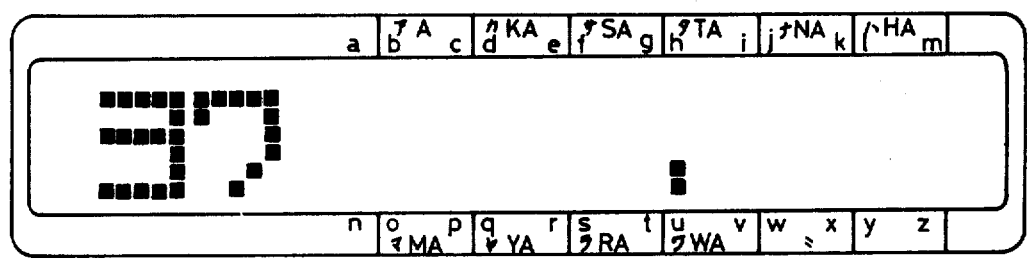
Figure 4:
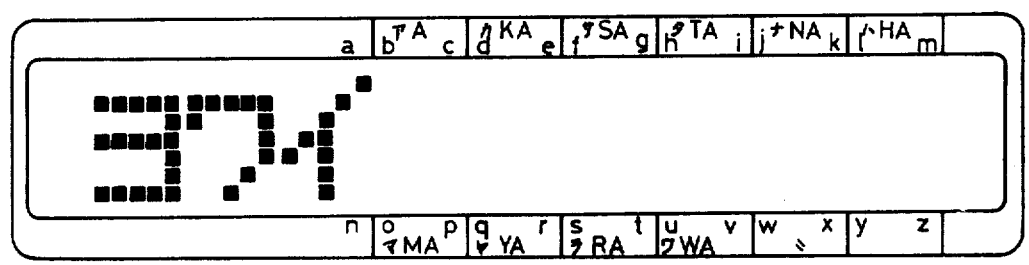

FIG. 4(1) shows a plurality of display dots used in searching one or more alphabets to be inputted in the Japanese to English translation mode. Among the display dots allotted in six lower digits, the first and the second dots from the top, and the first and second dots from the bottom (except the first and the second dots from the bottom in the lowest digit) are used in searching one or two alphabets to be inputted. These dots to be used are shown to be black.

FIGS. 4(2), 4(3), 4(4), 4(5) and 4(6) shows a case of selecting the first Japanese alphabets. FIGS. 4(7) and 4(8) shows a case of selecting the second Japanese alphabets. The Japanese syllabary indexes 13 contain ten Japanese alphabets, "katakana"s, each leading each of columns in the Japanese syllabary.

When a Japanese alphabet is selected, a Japanese alphabet leading the selected Japanese alphabet in a column in the Japanese syllabary is selected. At the same time, since five display dots are allotted to single leading alphabets, the number of the display dots illuminated in single digits equals the number of the row between the single leading alphabets and the selected Japanese alphabets.

FIG. 4(9) shows an example where a specific Japanese word is displayed in the display 11, the word being one leading the words starting with the alphabets selected in FIG. 4(8).

Figure 5:
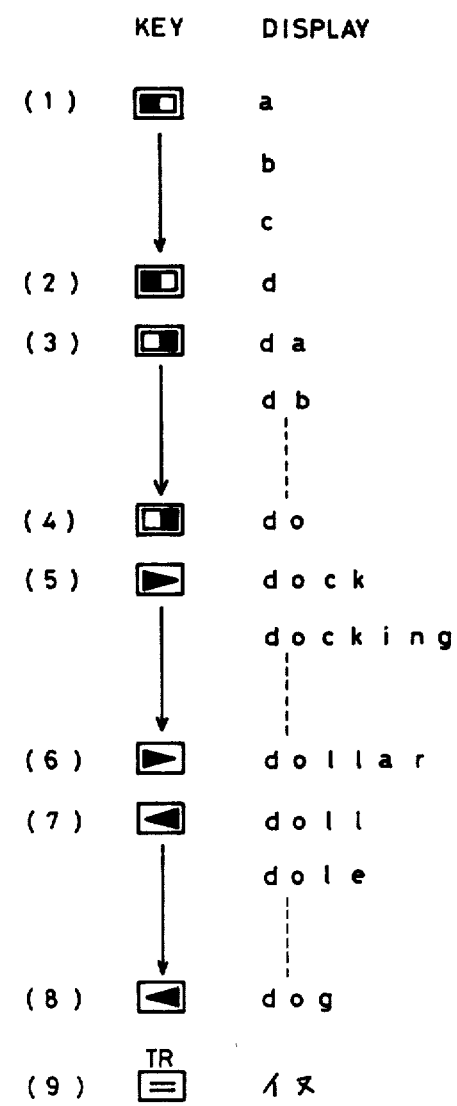
Figure 6:
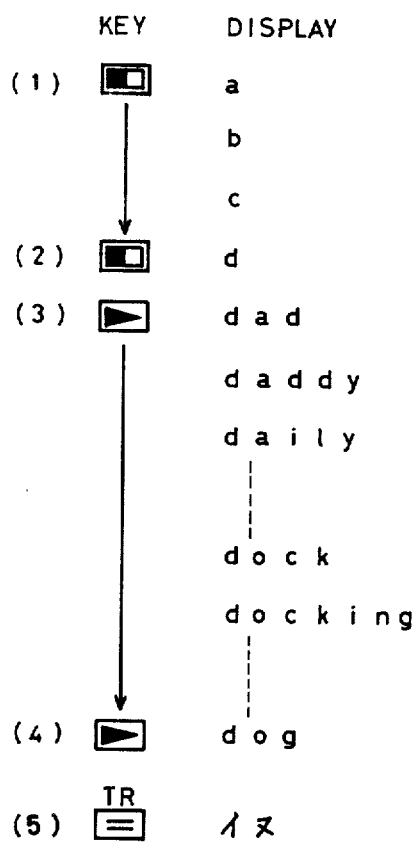
Figure 7:
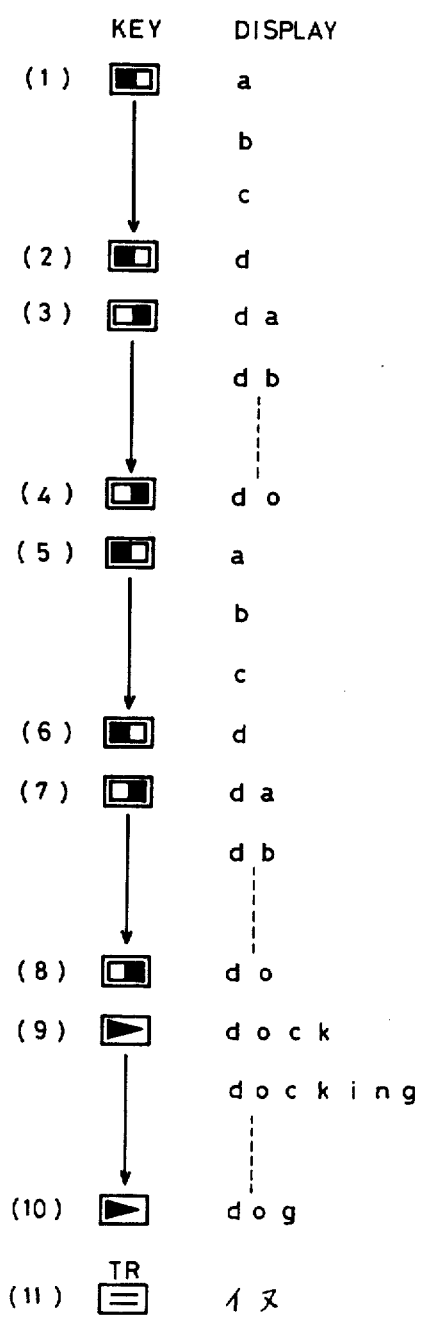

FIGS. 5 to 7 shows the relations between key switches operated and display examples to select an English word "dog" and translate it to Japanese in the English to Japanese translation mode.

As FIG. 5 shows, the backward search key 5 is operated when a word to be selected is overrun.

As FIG. 6 shows, only the first-letter forward search key 2 and the entry word forward search key 4 can be operated to select a first English letter and retrieve an entry word to be searched.

As FIG. 7 shows, even after the second-letter forward search key 3 is operated to select alphabets, the first-letter forward search key 2 can be re-operated to re-search first and second alphabets from the beginning.

FIGS. 8 and 9 show the relations between key switches operated and display examples to select a Japanese word and translate it to English in the Japanese to English translation mode.

As FIG. 8 shows, no distinction appears between full characters and small characters in searching the entry words. In Japanese, the large characters indicate a complete usual sound. The small characters indicate an assimilated sound, and a contracted sound, depending on the nature of the characters.

As FIG. 9 shows, the signs for the voiced sound, the semivoiced sound and the long sound are treated as a single character. After the Japanese alphabet "n", these signs for the voiced sound """, the semi-voiced sound "o", and the long sound "—" follows.

FIG. 10 shows the relations between key switches operated and display examples to mark some words and retrieve them.

FIG. 10-(1): In the English to Japanese translation mode, an entry word "dog" is retrieved.

FIG. 10-(2): The mark key 7 is operated to mark and memorize the entry word "dog".

FIG. 10-(3): In the Japanese to English translation mode, an entry Japanese word "ne-ko" is retrieved.

FIG. 10-(4): The mark key 7 is operated to mark and memorize this entry word.

According to the present invention, depending on the English to Japanese translation mode or the Japanese to English translation mode, a language in which a marked word is to be retrieved is selected. Thus, the mode selector 1 functions to select a language in which a marked word is to be retrieved.

FIGS. 10-(5) to 10-(8) show a case of retrieving the marked word in the English to Japanese translation mode. To retrieve the marked word, the clear/clear entry key 8 and, then, the mark key 7 are operated. As shown in FIG. 10, in the English to Japanese translation mode, the marked word is retrieved in English. In the Japanese to English translation mode, the marked word is retrieved in Japanese. The retrieval operation of the marked words is to retrieve the latest marked word at first and successively retrieve later words.

Figure 11:
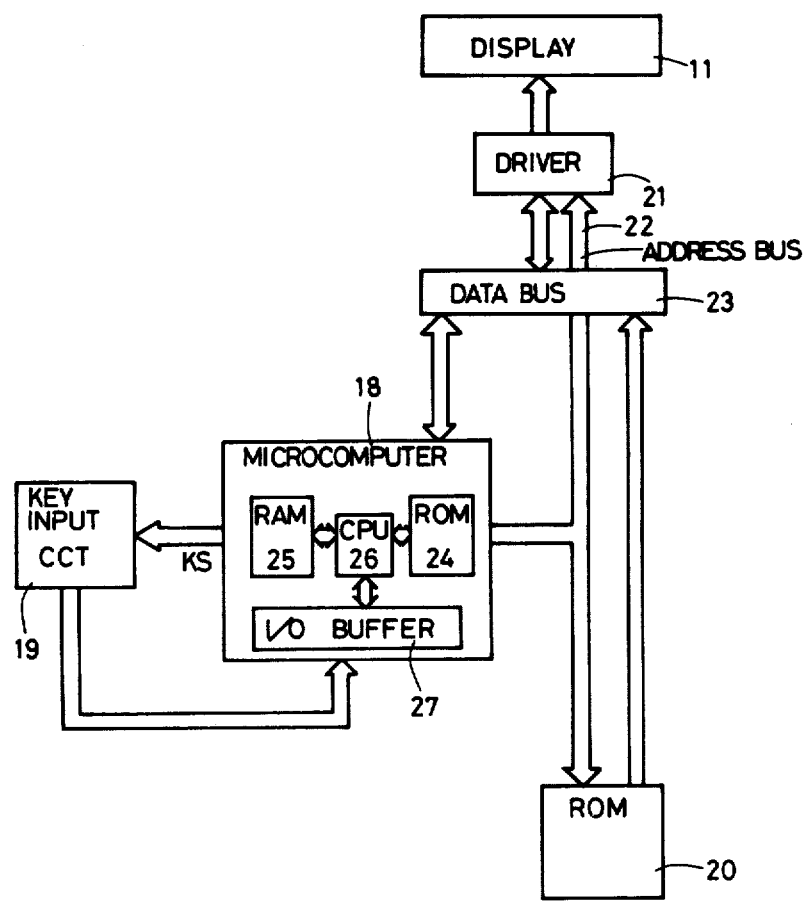
FIG. 11 shows a block diagram of a circuit implemented within the translator as shown in FIG. 1.

FIG. 11 shows a block diagram of a circuit implemented within the translator of FIG. 1.

The circuit of FIG. 11 comprises a microcomputer 18, a key input circuit 19, a ROM 20, a driver 21, the display 11.

An address bus 22 and a data bus 23 are provided.

The microcomputer 18 develops key strobe signals KS toward the key input circuit 19 and receives key input signals KI from the circuit 19 to detect the operations of the key switches in the circuit 19. The circuit 19 contains the key switches as shown in FIG. 1. The microcomputer 18 selects an address of the ROM 20 to read in the contents of the address.

The microcomputer 18 comprises a ROM 24, a RAM 25, a CPU 26 and an input/output buffer 27. An inner bus is provided to interconnect the ROM 24, the RAM 25, the CPU 26 and the input/output buffer 27. The ROM 24 stores a control program. The RAM 25 provides registers and flags. The CPU 26 serves to control calculation operations.

The ROM 20 stores a great number of English words and Japanese words used for the translator modes. The driver 21 is repsonsive to display pattern information provided by the microcomputer 18 for controlling to illuminate the dots in the display 11.

FIG. 12 shows the contents of the ROM 20. The ROM format 20 includes a plurality of memory regions EA, JA, WA, and SA.

The memory region WA is provided for storing the English words and the Japanese words. The Japanese words are stored in the Japanese alphabetical order. Each of the English words follows each of the Japanese words, said each of the Japanese words being equivalent to each of the English words in meaning. After the last English word, an end code is stored.

In the memory region WA, all the Japanese words are stored by treating the signs for the voiced sound, the semi-voiced sound, and the long sound as a single character. The words with these signs follow the wors with the character "n". No difference appears between the full characters and the small characters.

The memory region SA is provided for storing address information to align the English words stored in the memory region WA in the English alphabetical order and its reverse order. The memory region SA stores the address information for each of the English words in the order that the English words are aligned in the English alphabetical order.

The address as stored in the memory region SA is one in which a first alphabet leading each of the English words is stored. The addresses for the English words or the Japanese words as used hereinafter means an address in which a first alphabet leading each of the English words or the Japanese words is stored.

After the address for the last English word "zoo", an end code is stored.

The memory region EA is an English start address table for storing a number of start addresses for leading first words of the English words starting with each of the alphabets "a" to "z". Each of the start addresses is represented by "S.A." in FIG. 12.

The memory region JA is a Japanese start address table for storing a number of start addresses "S.A." for leading first words of the Japanese words starting with each of the Japanese "katakanas".

Although not specifically shown in the drawings, it may be possible that a memory area for storing the English words is separated from another memory area for storing the Japanese words. The corresponding English and Japanese words may be stored in the same serial number addresses.

Figure 13:
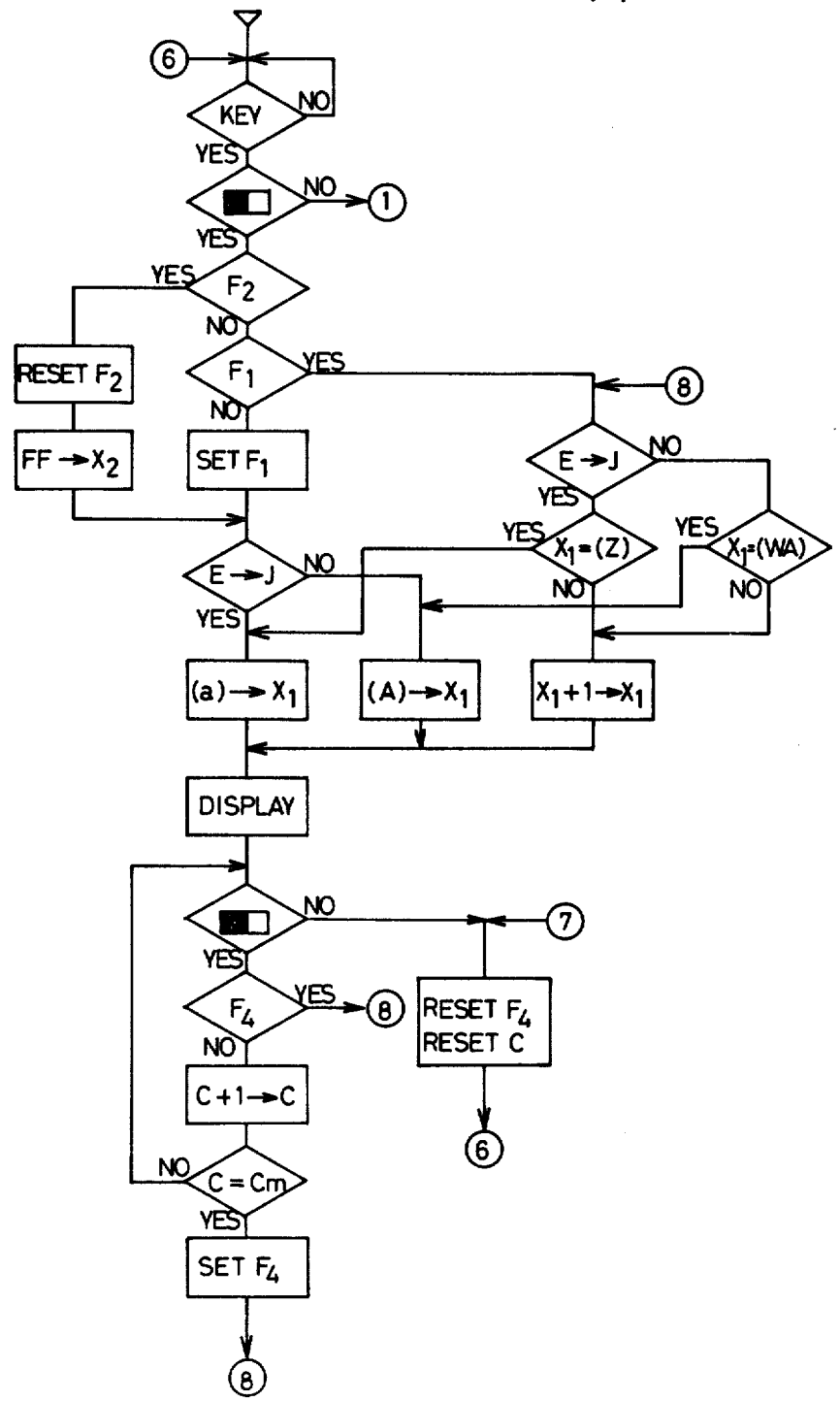
FIGS. 13(1) to 13(7) show a flow chart of the operations of a microcomputer connected in the circuit of FIG. 11.
Figure 13:
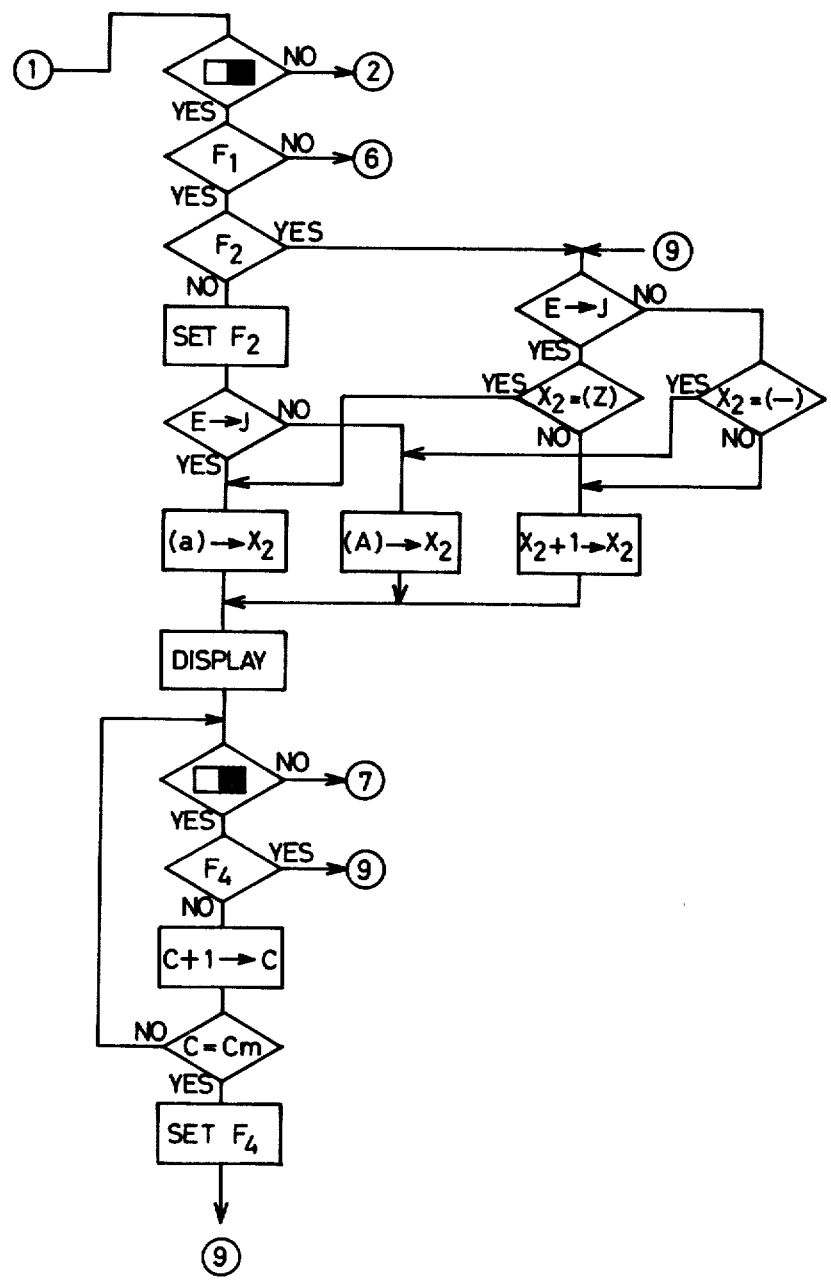
Figure 13:
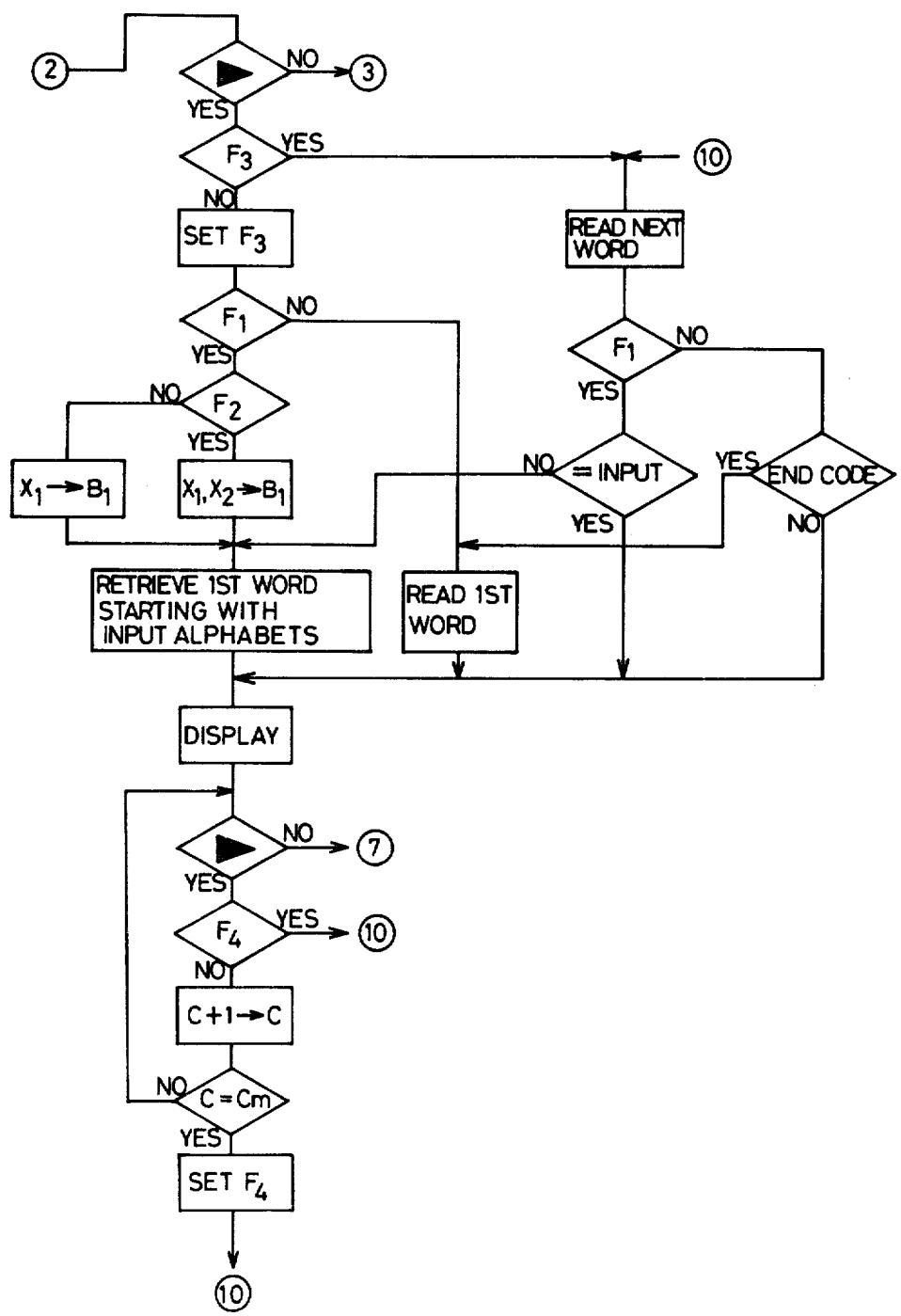
Figure 13:
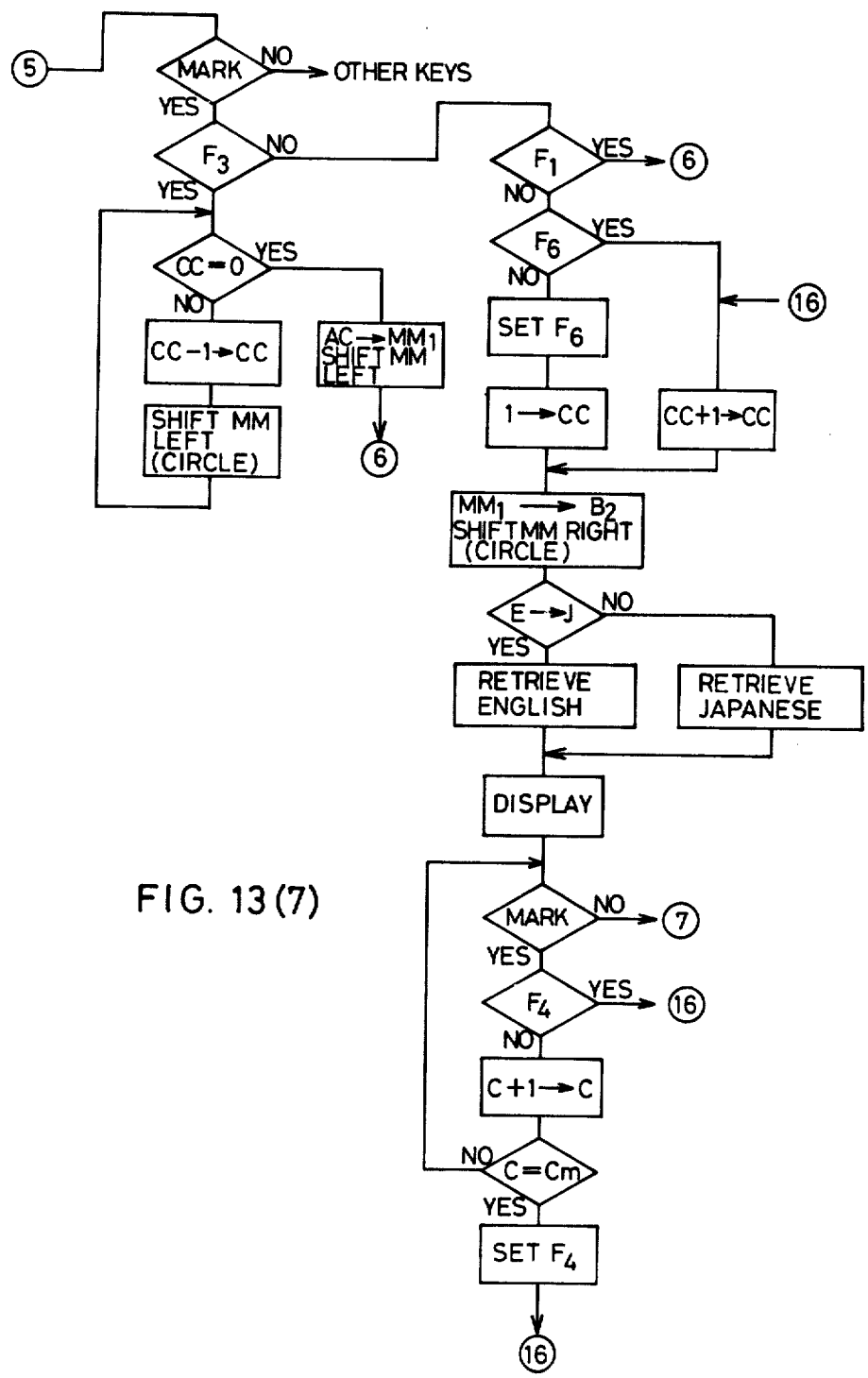
Figure 15:
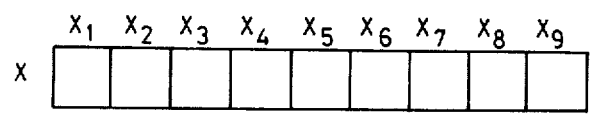
FIG. 15 shows the construction of a display register X provided within a RAM connected in the circuit of FIG. 11.
Figure 16:
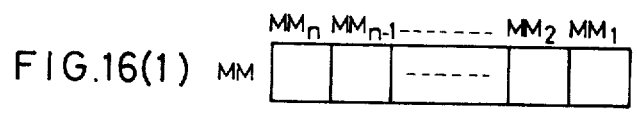
FIGS. 16(1) to 16(4) show the construction of a register MM for storing marked words.
Figure 16:
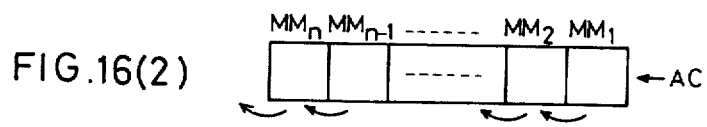
Figure 16:
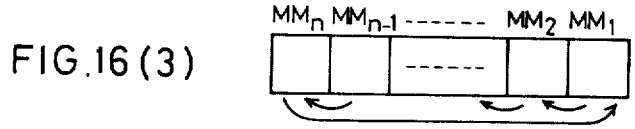
Figure 16:
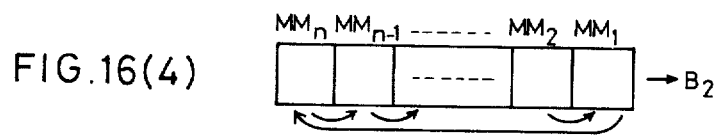

FIGS. 13(1) to 13 (7) show flow charts for the operation of the micro computer 18 of FIG. 11, as related to the present invention. FIGS. 14(1) and 14(2) show the relations between the alphabets and signs, and the codes. FIG. 15 shows a display register X provided in the RAM 25. FIGS. 16(1) to 16(4) show a register MM for storing marked words, the register MM being provided in the RAM 25.

The RAM 25 in the microcomputer 18 contains five flags $F_1$, $F_2$, $F_3$, $F_4$, and $F_5$, a counter C, a register B.

The flag $F_1$ is set to indicate that the first-letter forward search key 2 has been operated. The flag $F_2$ is set to indicate that the second-letter forward search key 3 has been operated. The flag $F_3$ is set to indicate that the entry word forward search key 4 or the backward search key 5 has been operated. The flag $F_4$ is set to indicate that every key switch has continued to be operated for a predetermined time. The flag $F_5$ is set to indicate that the clear/clear entry key 8 has just been operated.

The counter C is provided for counting when every key switch has continued to be operated. A predetermined time for the counter C is denoted as Cm. The register B is provided for storing selected first and second alphabets.

The symbols corresponding to these elements $F_1$ to $F_5$, B and C are shown in the flow chart of FIGS. 13(1) to 13(7). In FIGS. 13(1) to 13(7), an alphabet code for an alphabet "a" is represented as (a). A code for a sign is also represented as parenthesized by parentheses. FF (="11111111") indicates a blank code.

With reference to FIG. 13(3), a step referring to "RETRIEVE 1ST WORD STARTING WITH INPUT ALPHABETS" is executed to retrieve a first word of words starting with the selected first and second alphabets in the alphabetical order. A step referring to "READ 1ST WORD" is executed to read out the first word in the alphabetical order. A step referring to "READ NEXT WORD" is executed to read out the next word in the alphabetical order.

In FIG. 13(3), a step referring to "=INPUT" is executed to determine whether a first or second alphabet of the retrieved word equals the first or second alphabet selected, or not. In the steps referring to "RETRIEVE 1ST WORD STARTING WITH INPUT ALPHABETS" and "=INPUT", when the small characters are developed as the second alphabets, the small characters are changed to the full characters for comparison.

With reference to FIG. 13(4), a step referring to "READ PRECEDING WORD BY ONE" is executed to retrieve a preceding word by one in the alphabetical order.

As used in the flow chart of FIG. 13(7), the RAM 25 in the microcomputer 18 contains a flag $F_6$, a counter CC, a buffer register $B_2$, and an address counter AC.

The flag $F_6$ is set to indicate that the mark key 7 has been operated. The counter CC is provided for counting how number the mark register MM has been shifted. The address counter AC is for addressing the ROM 20.

While a word is being displayed in the display 11 after retrieved from the ROM 20, the mark key 7 is operated to input the address of the word into the lowest portion $MM_1$ of the mark register MM. The address of the word is an address for storing a first letter of the Japanese word just preceding the word when the word is English. When the word is Japanese, the address of the word is an address for storing a first letter of the word. The contents of the mark register MM are shifted left by one digit as FIG. 16(2) shows. The contents of the top portion MMn are canceled by left shifting. Therefore, the maximum number of the words to be marked is "n".

The flag $F_6$ is set by operating the mark key 7 after operating the clear/clear entry key 8. "1" is inputted into the counter CC. The contents of the register portion $MM_1$ are outputted into the buffer register $B_2$. The contents of the register MM are shifted right by one digit (circulation) as FIG. 16(4) shows.

In the English to Japanese translation mode, a first English word is retrieved which leads the words stored in the addresses following the read out address. The first English word is displayed. When the translation key 6 is operated, the English word is translated. The mark key 7 is operated to count up the counter CC.

The above operations are repeated to retrieve the second marked English word. In the Japanese to English translation mode, a step referring to "RETRIEVE JAPANESE" is executed to retrieve the Japanese word stored in the address following the read out address and display it. When the mark key 7 continues to be operated, the marked words can be retrieved and displayed from the latest one to the earliest one.

After the marked word is retrieved, a new word can be marked by cancelling the contents of the mark register MM and conducting the marking operation as FIG. 16(3) shows.

Power supply is enabled to the mark register MM and the counter CC even when the main power switch is turned off. The contents of the elements MM and CC are maintained.

Although not shown in FIGS. 13(1) to 13(7), after one or two alphabets are selected and the translation key 6 is operated, a translated word is developed when an entry word containing one or two alphabets is stored. When such an entry word is not stored, a first entry word of words starting with the one or two alphabets is retrieved. In the latter case, the translation key 6 is further operated to translate and display the first entry word.

When the translation key 6 is operated to translate a word and the key 6 is further operated, the original word is retrieved and displayed. Thereafter, each time the translation key 6 is operated, a translated word is switched.

When any alphabets are selected which are not alphabets leading to the stored entry words, it is detected that no entry words starting with the selected alphabets are stored, and entry words starting with the first alphabet of the selected alphabets are retrieved and displayed.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An input device for inputting a first word represented in a first language, the input device being adapted for an electronic translator for obtaining a second word represented in a second language, equivalent to the first word, in response to the input of the first word, comprising:

first specifying means for specifying one of alphabets to define a first alphabet;

second specifying means for specifying one of the alphabets to define a second alphabet;

input means for controlling the first and the second specifying means to input said first and second alphebets into the electronic translator;

memory means for memorizing a plurality of full words;

access means provided for addressing the memory means to retrieve words starting with the first and second alphabets; and display means responsive to the access means for displaying the words.

2. The device of claim 1, wherein the specifying means comprises alphabet indexes, a dot display for specifying one of the alphabet indexes and a forward-/backward search key means for forwarding/backing the dot display.

3. The device of claim 2, wherein the memory means stores a plurality of words in the first language and words in the second language, and a translation key is provided for enabling that the memory means develops the second word.

4. The device of claim 2, wherein the forward/backward search key means is operated to read out a word following/preceding the first word from the memory means.

5. The device of claim 1, further comprising a microcomputer comprising:

first flag means for indicating that the first specifying means has been operated;

second flag means for indicating that the second specifying means has been operate;

third flag means for indicating that a forward/backward search key means has been operated to forward/backward words following/preceding the first word from the memory means;

fourth flag means for indicating that the first specifying means or the second specifying means continues to be operated for a predetermined time;

fifth flag means for indicating that a clear/clear entry key means has been just operated to totally or partially cancel the first and the second alphabets; and buffer means for storing codes representative of the first and the second alphabets.

6. The device of claim 2 wherein the dot display is constituted as an analog display when a plurality of alphabets are specified by the first and the second specifying means.

7. The device of claim 1 further comprising mark means for marking a word selected from the first word or the second word so that the mark means is operated to directly retrieve the marked word.

8. The device of claim 7 further comprising a microcomputer comprising:

sixth flag means for indicating that the mark means has been operated;

mark register for storing the marked word, the mark register comprising a plurality of storage locations; and counter means for counting shifting number of the contents of the storage locations of the mark register.

9. The device of claim 1 further comprising mode selector means actuated to select a mode of translating the first language to the second language and its reverse translation mode.

* * * * *